United States Patent
McCaffrey

(10) Patent No.: US 11,047,245 B2
(45) Date of Patent: Jun. 29, 2021

(54) CMC COMPONENT ATTACHMENT PIN

(71) Applicant: United Technologies Corporation, Farmington, CT (US)

(72) Inventor: Michael G. McCaffrey, Windsor, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 81 days.

(21) Appl. No.: 16/538,191

(22) Filed: Aug. 12, 2019

(65) Prior Publication Data

US 2021/0047936 A1    Feb. 18, 2021

(51) Int. Cl.
  *F01D 5/30* (2006.01)
  *F01D 25/24* (2006.01)

(52) U.S. Cl.
  CPC ......... *F01D 5/3053* (2013.01); *F01D 25/246* (2013.01); *F05D 2300/10* (2013.01); *F05D 2300/20* (2013.01)

(58) Field of Classification Search
  CPC .... F01D 5/3053; F01D 25/246; F01D 25/243; F05D 2300/10; F05D 2300/20; B64D 27/26; B64D 2027/266
  See application file for complete search history.

(56) References Cited

U.S. PATENT DOCUMENTS

| | | | |
|---|---|---|---|
| 4,491,436 A * | 1/1985 | Easton | E02F 9/006 403/122 |
| 6,991,094 B2 | 1/2006 | Frost | |
| 7,416,362 B2 * | 8/2008 | North | F16B 5/0241 267/150 |
| 8,851,417 B2 | 10/2014 | Sandy | |
| 9,909,430 B2 * | 3/2018 | Freeman | F01D 5/3053 |
| 10,370,997 B2 * | 8/2019 | Vetters | F01D 25/246 |
| 10,598,045 B2 * | 3/2020 | Tableau | F01D 11/005 |
| 10,815,810 B2 * | 10/2020 | Barker | F01D 11/005 |
| 2010/0183435 A1 * | 7/2010 | Campbell | F01D 5/282 415/209.3 |
| 2016/0305265 A1 * | 10/2016 | Stapleton | F01D 25/246 |
| 2017/0044920 A1 * | 2/2017 | Vetters | F01D 11/12 |
| 2017/0146026 A1 * | 5/2017 | Griffin | F04D 29/542 |
| 2019/0112947 A1 | 4/2019 | Walston et al. | |

FOREIGN PATENT DOCUMENTS

| | | |
|---|---|---|
| EP | 2784269 | 10/2014 |
| EP | 3103971 | 12/2016 |

OTHER PUBLICATIONS

Extended EP Search Report for EP Application No. 20188708.0 dated Nov. 24, 2020.

* cited by examiner

*Primary Examiner* — Jesse S Bogue

(74) *Attorney, Agent, or Firm* — Carlson, Gaskey & Olds, P.C.

(57) ABSTRACT

A flow path component assembly includes a carrier that has at least one radially extending tab. A flow path component has a base portion and a first wall that extends radially from the base portion. The first wall has an aperture. A pin extends through a hole in the radially extending tab and the aperture. The pin has an ellipsoid portion between a first end and a second end.

20 Claims, 4 Drawing Sheets

CMC COMPONENT ATTACHMENT PIN

BACKGROUND

This application relates to an attachment pin for a flowpath component, such as a blade outer air seal assembly.

Gas turbine engines are known and typically include a compressor compressing air and delivering it into a combustor. The air is mixed with fuel in the combustor and ignited. Products of the combustion pass downstream over turbine rotors, driving them to rotate.

It is desirable to ensure that the bulk of the products of combustion pass over turbine blades on the turbine rotor. As such, it is known to provide blade outer air seals radially outwardly of the blades. Blade outer air seals have been proposed made of ceramic matrix composite fiber layers.

SUMMARY OF THE INVENTION

In one exemplary embodiment, a flow path component assembly includes a carrier that has at least one radially extending tab. A flow path component has a base portion and a first wall that extends radially from the base portion. The first wall has an aperture. A pin extends through a hole in the radially extending tab and the aperture. The pin has an ellipsoid portion between a first end and a second end.

In a further embodiment of any of the above, the first wall is sandwiched between a first radially extending tab having a first hole and a second radially extending tab having a second hole.

In a further embodiment of any of the above, the second hole is smaller than the first hole In a further embodiment of any of the above, the first and second radially extending tabs are spaced apart in a circumferential direction.

In a further embodiment of any of the above, the first and second radially extending tabs are spaced apart by a distance that is greater than a length of the ellipsoid portion.

In a further embodiment of any of the above, the ellipsoid portion of the pin has a radius of curvature between about 0.5 and about 2 inches.

In a further embodiment of any of the above, the pin is oriented in a generally circumferential direction.

In a further embodiment of any of the above, the pin is a unitary piece.

In a further embodiment of any of the above, a sleeve is arranged in the aperture radially outward of the pin.

In a further embodiment of any of the above, the sleeve is a metallic material.

In a further embodiment of any of the above, the pin is a cobalt alloy.

In a further embodiment of any of the above, the at least one segment is a ceramic material.

In a further embodiment of any of the above, the carrier is a metallic material.

In a further embodiment of any of the above, the flow path component is one of a blade outer air seal, a combustor liner, a transition duct, an exhaust nozzle panel, and a turbine airfoil platform.

In another exemplary embodiment, a turbine section for a gas turbine engine includes a turbine blade that extends radially outwardly to a radially outer tip and for rotation about an axis of rotation. A flow path component has a plurality of segments mounted on a carrier and arranged circumferentially about the axis of rotation. At least one of the plurality of segments have a radially extending wall with an aperture. A pin extends through the aperture and a hole in the carrier. The pin has an ellipsoid portion between a first end and a second end.

In a further embodiment of any of the above, the hole is on a first radially inwardly extending tab of the carrier. The carrier has a second radially inwardly extending tab that has a second hole. The radially extending wall is arranged between the first and second radially inwardly extending tabs. The pin extends through the hole and the second hole.

In a further embodiment of any of the above, the pin is a unitary piece.

In a further embodiment of any of the above, a sleeve is arranged in the aperture radially outward of the pin.

In a further embodiment of any of the above, the at least one segment is a ceramic material.

In a further embodiment of any of the above, the carrier is a metallic material.

DETAILED DESCRIPTION

Figure 1:
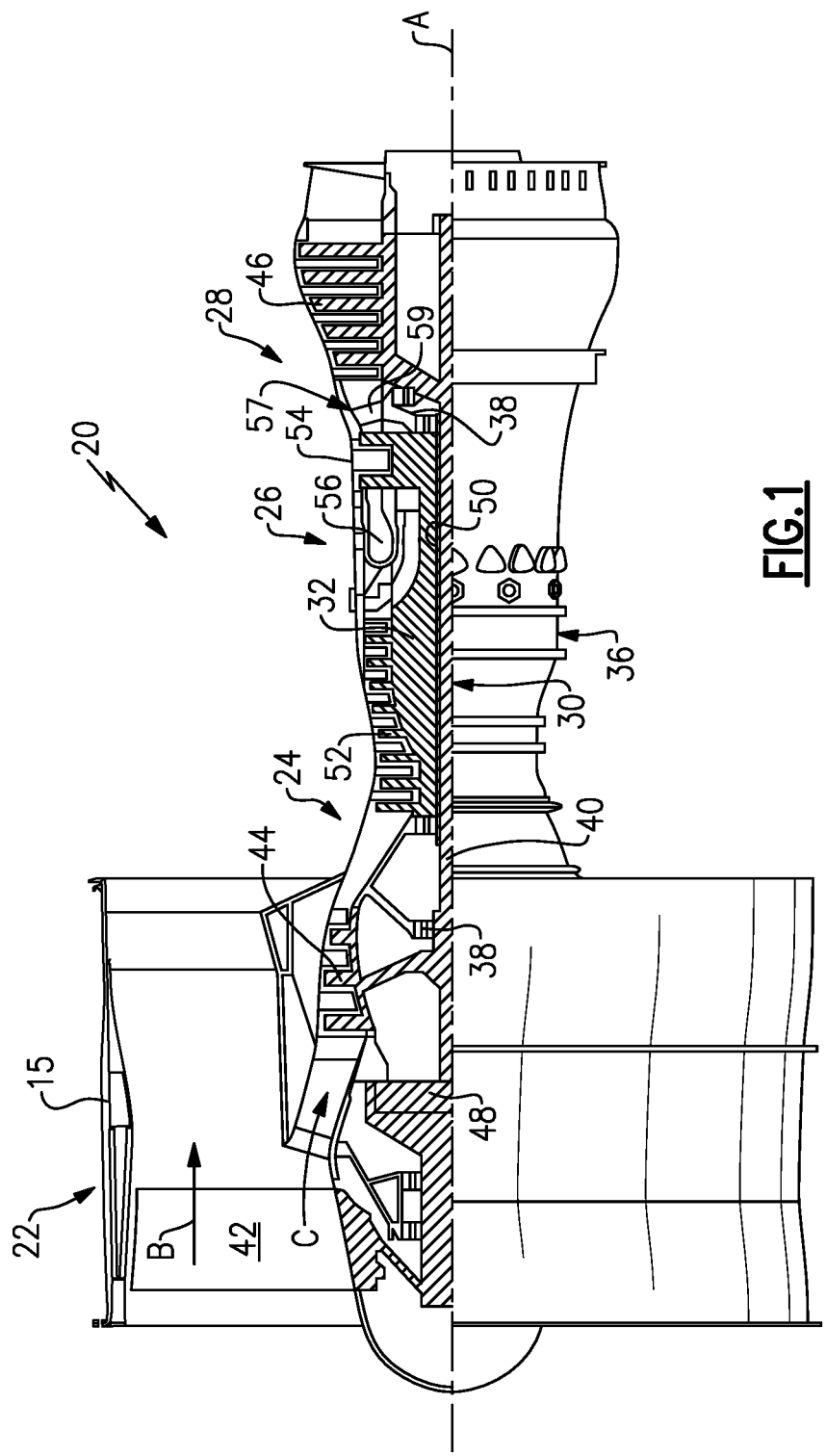
FIG. 1 schematically illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
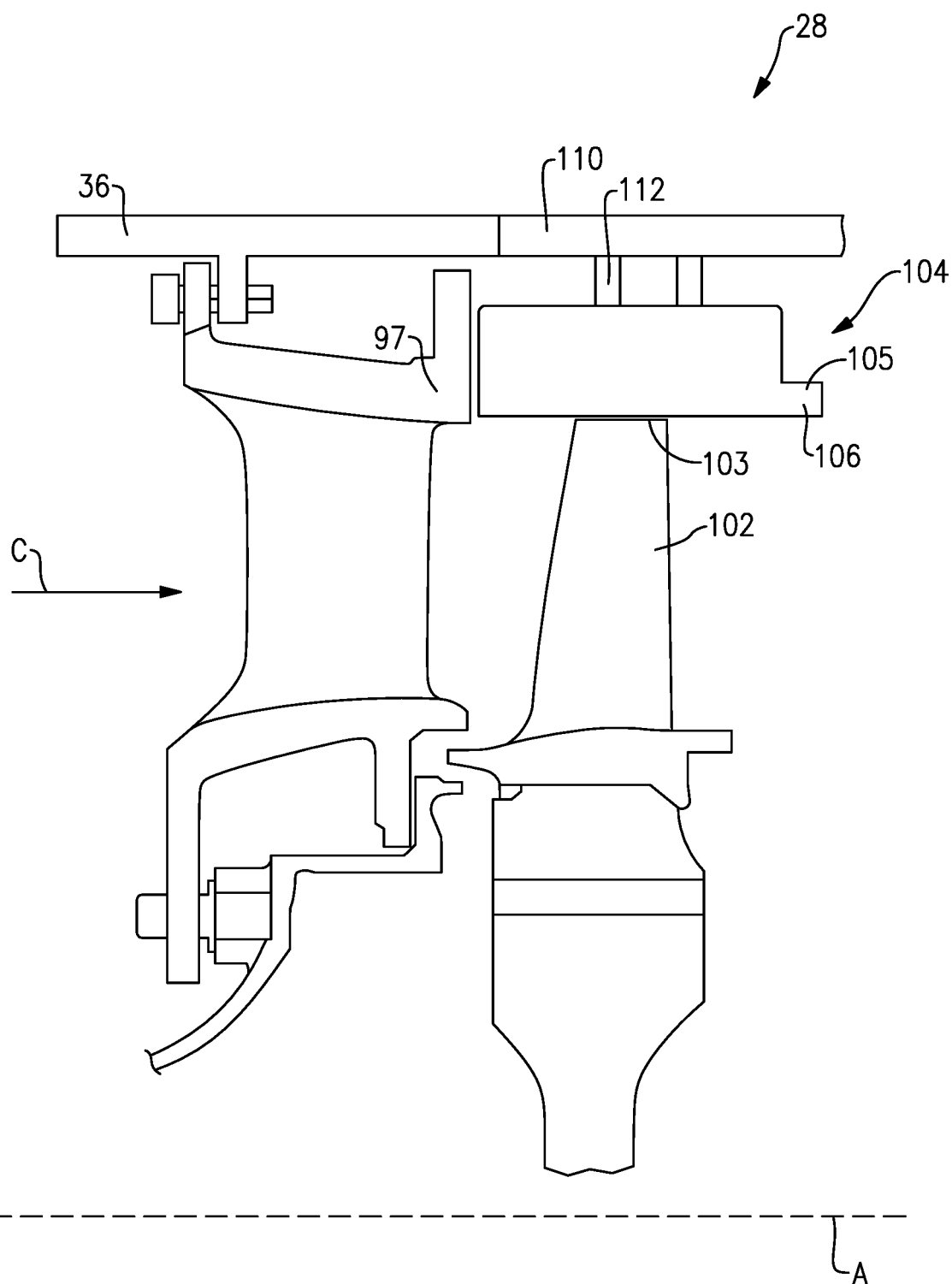
FIG. 2 schematically illustrates an example turbine section.

FIG. 2 shows a portion of an example turbine section 28, which may be incorporated into a gas turbine engine such as the one shown in FIG. 1. However, it should be understood that other sections of the gas turbine engine 20 or other gas turbine engines, and even gas turbine engines not having a fan section at all, could benefit from this disclosure. The turbine section 28 includes a plurality of alternating turbine blades 102 and turbine vanes 97.

A turbine blade 102 has a radially outer tip 103 that is spaced from a blade outer air seal assembly 104 with a blade outer air seal ("BOAS") 106. The BOAS 106 may be made up of a plurality of seal segments 105 that are circumferentially arranged in an annulus about the central axis A of the engine 20. The BOAS segments 105 may be monolithic bodies that are formed of a ceramic material, such as a ceramic matrix composite ("CMC") or monolithic ceramic.

The BOAS 106 may be mounted to an engine case or structure, such as engine static structure 36 via a control ring or support structure 110 and a carrier 112. The engine structure 36 may extend for a full 360° about the engine axis A. The engine structure 36 may support the support structure 110 via a hook or other attachment means. The engine case or support structure holds the BOAS 106 radially outward of the turbine blades 102. Although a BOAS 106 is described, this disclosure may apply to other components, and particularly flow path components. For example, this disclosure may apply to combustor liner panels, transition ducts, exhaust nozzle liners, and separate turbine airfoil platforms, or other CMC components.

Figure 3:
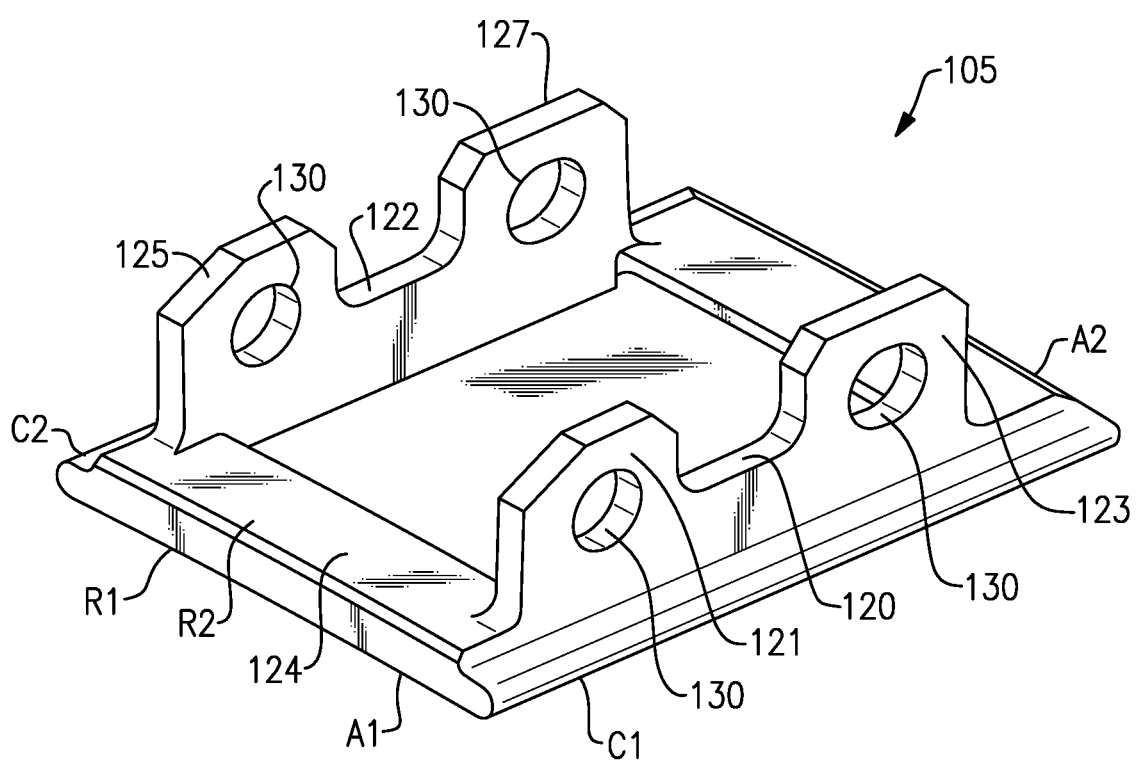
FIG. 3 illustrates an exemplary blade outer air seal.

FIG. 3 illustrates an example BOAS segment 105. Each seal segment 105 is a body that defines radially inner and outer sides R1, R2, respectively, first and second axial sides A1, A2, respectively, and first and second circumferential sides C1, C2, respectively. The radially inner side R1 faces in a direction toward the engine central axis A. The radially inner side R1 is thus the gas path side of the seal segment 105 that bounds a portion of the core flow path C. The first axial side A1 faces in a forward direction toward the front of the engine 20 (i.e., toward the fan 42), and the second axial side A2 faces in an aft direction toward the rear of the engine 20 (i.e., toward the exhaust end).

In the illustrated example, each BOAS segment 105 includes a first wall 120 and a second wall 122. The first and second walls 120, 122 extend generally radially outward from a base portion 124. The first and second walls 120, 122 extend along an axial length of the seal segment 105. The first and second walls 120, 122 may be substantially perpendicular to the base portion 124, in one example. The first and second walls 120, 122 are arranged near the first and second circumferential sides C1, C2, respectively. First and second tabs 121, 123 extend radially outward from the first wall 120, and first and second tabs 125, 127 extend radially outward from the second wall 122. An aperture 130 extends through each of the tabs 121, 123, 125, 127. The apertures 130 may be round or oblong in shape, for example. The first and second walls 120, 122 extend along the base portion 124 in a generally axial direction, and are circumferentially spaced from one another. The base portion 124 extends between the first and second axial sides A1, A2 and defines a gas path on a radially inner side and a non-gas path on a radially outer side. In this disclosure, forward, aft, upstream, downstream, axial, radial, or circumferential is in relation to the engine axis A unless stated otherwise. The base portion 124 may extend axially forward and/or aft of the first and second walls 120, 122 to provide a surface for sealing of the BOAS first and second axial sides A1, A2. The apertures 130 provide surfaces for securing the BOAS segment 105 to the carrier 112 and/or support structure 110.

The BOAS 106 may be formed of a ceramic matrix composite ("CMC") material. Each seal segment 105 is formed of a plurality of CMC laminates. The laminates may be silicon carbide fibers, formed into a braided or woven fabric in each layer. In other examples, the BOAS 106 may be made of a monolithic ceramic.

CMC components such as BOAS segments 105 are formed by laying fiber material, such as laminate sheets or braids, in tooling, injecting a gaseous infiltrant into the tooling, and reacting to form a solid composite component. The component may be further densified by adding additional material to coat the laminates. In some examples, the base portion 124 and first and second walls 120, 122 may be formed from the same number of laminate plies, and thus have substantially the same thickness.

Figure 4:
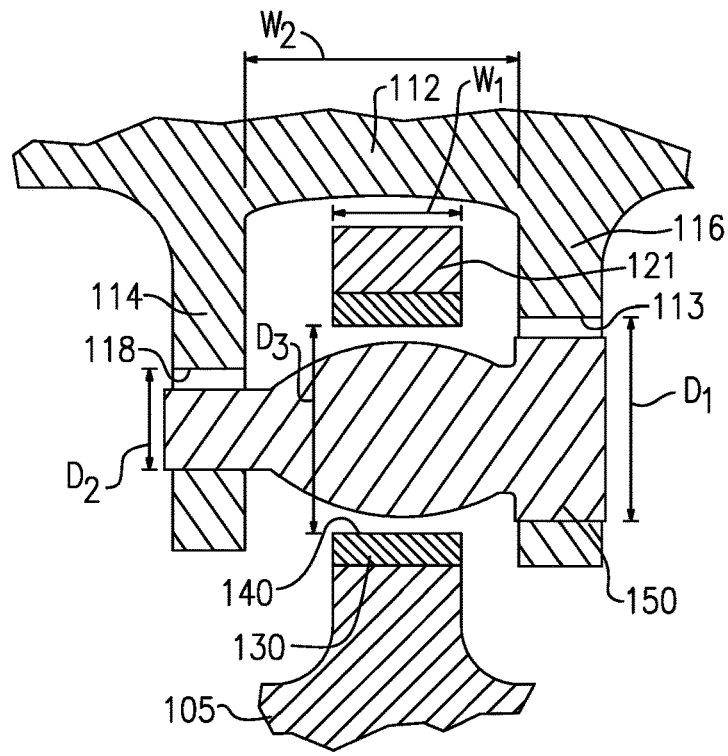
FIG. 4 illustrates a portion of an exemplary blade outer air seal assembly.

FIG. 4 illustrates a portion of the example BOAS assembly 104. The carrier 112 includes radially inwardly extending tabs 114, 116. The tabs 114, 116 are spaced apart from one another in the circumferential direction. The tabs 114, 116 are configured to receive at least one of the tabs 121, 123, 125, 127 of the seal segment 105 between them. The tab 121 of the seal segment 105 has a width $W_1$ in the circumferential direction. The radially inwardly extending tabs 114, 116 on the carrier 112 are separated by a width $W_2$ in the circumferential direction. The width $W_2$ is greater than the width $W_1$ so that the tab 121 fits between the tabs 114, 116. The width $W_2$ also permits bending of the seal segment 105 relative to the carrier 112. In one example, a difference between the width $W_2$ and the width $W_1$ may be between about 0.010 and 0.100 inches (0.254-2.54 mm).

Each of the tabs 114, 116 has a hole 118, 113, respectively. The hole 113 in the tab 116 has a diameter $D_1$ and the hole 118 in the tab 114 has a diameter $D_2$. The diameter $D_1$ is larger than the diameter $D_2$, in some examples. The aperture 130 in tab 121 has an opening diameter $D_3$. The diameter $D_2$ is smaller than the diameter $D_3$. In some examples, the diameter $D_1$ is the same or slightly larger than the diameter $D_3$. When the assembly 104 is assembled, the holes 118, 113, and the aperture 130 are substantially concentric.

A pin 150 extends through the holes 113, 118 and the aperture 130 to secure the seal segment 105 to the carrier 112. The pin 150 extends in a substantially circumferential direction. The pin 150 secures the seal segment 105 in the axial and radial directions relative to the carrier 112.

In some examples, a sleeve 140 is arranged in the aperture 130 in the BOAS segment 105. The sleeve 140 may be formed from a material having a low wear rate at high temperatures. The sleeve 140 may be a metallic material, such as cobalt, for example. The sleeve 140 is inserted into the aperture 130, and the pin 150 is received within the sleeve 140. The sleeve 140 may be press fit into the aperture 130, for example. The sleeve 140 may help distribute the load over a larger area and isolate the CMC BOAS segment 105 from contact. The sleeve 140 may also help prevent delamination of the CMC BOAS segment 105.

Figure 5:
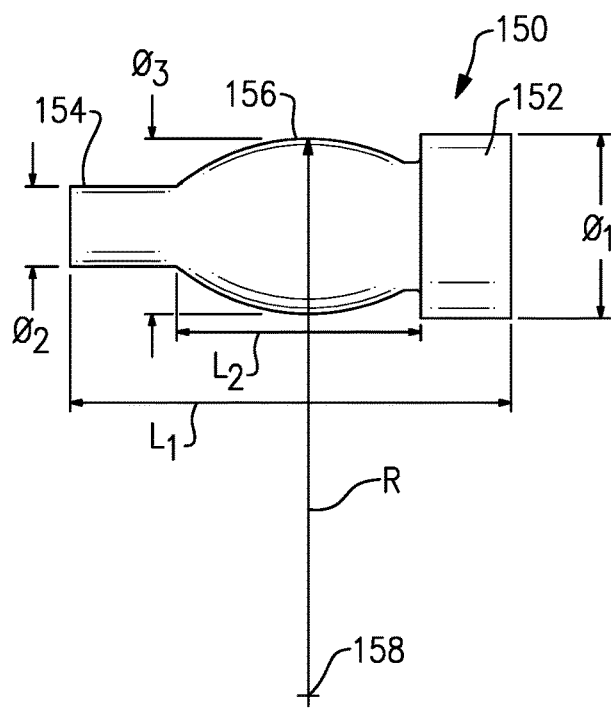
FIG. 5 illustrates an exemplary pin for a blade outer air seal assembly.

FIG. 5 illustrates an example pin for the BOAS assembly 104. The pin 150 has an ellipsoid portion 156 between a pin head 152 and an end 154. The head 152 engages with the hole 113, the end 154 engages with the hole 118, and the ellipsoid portion 156 engages with the aperture 130. The head 152 has a diameter $\theta_1$, the end 154 has a diameter $\theta_2$, and the ellipsoid portion 156 has a maximum diameter $\theta_3$. The diameter this larger than the diameter $\theta_2$. In some examples, the diameter $\theta_1$ is larger than the diameter $\theta_3$. The diameter $\theta_1$ may be between about 0.15 and 0.50 inches (3.81-12.7 mm), in one example. In a further example, the diameter Oi is about 0.25 inches (6.35 mm).

The ellipsoid portion 156 has a ellipsoid shape for a portion of the length $L_1$ of the pin 150. The ellipsoid portion 156 has a length of $L_2$. The length $L_2$ may be at least half the length $L_1$, for example. The ellipsoid portion 156 is convex relative to the end 154. The ellipsoid portion 156 may be barrel shaped or spherical, for example. The surface of the ellipsoid portion 156 has a radius of curvature R relative to a point 158. The radius of curvature R may be about 0.5 to 2 inches, for example (13.7-50.8 mm). In a further example, the radius of curvature R may be about 0.75 inches (19.05 mm). The radius of curvature R is large compared to the size of the pin 150. The ellipsoid portion 156 provides a curved surface for contact with the aperture 130. The curved surface allows contact between the pin 150 and the aperture 130 even when the curvature between the BOAS segment 105 and the carrier 112 changes.

In an example, the pin 150 is a unitary piece. The pin 150 may be a metallic material, such as cobalt, for example. A BOAS segment 105 may be secured to the carrier 112 using multiple pins 150. In one example, four pins 150 are used to secure the BOAS segment 105. In other examples, more or fewer pins 150 may be used in an BOAS assembly 104.

Known attachment pins for CMC BOAS segments may concentrate the load on the edge of the CMC hole, creating a bending moment when there is a difference in curvature between the CMC BOAS segment and carrier. This can reduce the ultimate strength of the CMC component and lead to part fracture. The disclosed attachment pin 150 having an ellipsoid portion helps control the location of the load path between the BOAS segment 105 and the carrier 112. As the BOAS segment and carrier change curvatures in response to transient and steady-state thermals and loads, the ellipsoid surface of the pin will remain in contact with the aperture of the BOAS segment and the carrier holes. This helps prevent a bending moment in the BOAS segment, which reduces peak stresses and allows for greater reliability and reduced features size for lower weight and cost.

Although a particular BOAS arrangement is shown, the disclosed pin may be used for securing other BOAS arrangements. In particular, the disclosed pin may be used for BOAS segments formed from CMC materials. Additionally, the disclosed pin may be used for the attachment other segmented flowpath components in gas turbine engines, such as combustor liner panels, transition ducts, exhaust nozzle liners, and separate turbine airfoil platforms.

In this disclosure, "generally axially" means a direction having a vector component in the axial direction that is greater than a vector component in the circumferential direction, "generally radially" means a direction having a vector component in the radial direction that is greater than a vector component in the axial direction and "generally circumferentially" means a direction having a vector component in the circumferential direction that is greater than a vector component in the axial direction.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:
1. A flow path component assembly, comprising:
 a carrier having at least one radially extending tab;
 a flow path component having a base portion and a first wall extending radially from the base portion, the first wall having an aperture; and a pin extending through a hole in the radially extending tab and the aperture, the pin having an ellipsoid portion between a first end and a second end, wherein the pin is oriented in a generally circumferential direction, wherein the circumferential direction is perpendicular to a flow path direction and a radial direction.

2. The flow path component assembly of claim 1, wherein the first wall is sandwiched between a first radially extending tab having a first hole and a second radially extending tab having a second hole.

3. The flow path component assembly of claim 2, wherein the second hole is smaller than the first hole.

4. The flow path component assembly of claim 2, wherein the first and second radially extending tabs are spaced apart in the circumferential direction.

5. The flow path component assembly of claim 4, wherein the first and second radially extending tabs are spaced apart by a distance that is greater than a length of the ellipsoid portion.

6. The flow path component assembly of claim 1, wherein the ellipsoid portion of the pin has a radius of curvature between 0.5 and 2 inches.

7. The flow path component assembly of claim 1, wherein the pin is a unitary piece.

8. The flow path component assembly of claim 1, wherein a sleeve is arranged in the aperture radially outward of the pin.

9. The flow path component assembly of claim 8, wherein the sleeve is a metallic material.

10. The flow path component assembly of claim 1, wherein the pin is a cobalt alloy.

11. The flow path component assembly of claim 1, wherein the flow path component is a ceramic material.

12. The flow path component assembly of claim 1, wherein the carrier is a metallic material.

13. The flowpath component assembly of claim 1, wherein the flow path component is one of a blade outer air seal, a combustor liner, a transition duct, an exhaust nozzle panel, and a turbine airfoil platform.

14. A turbine section for a gas turbine engine, comprising:
a turbine blade extending radially outwardly to a radially outer tip and for rotation about an axis of rotation;
a flow path component having a plurality of segments mounted on a carrier and arranged circumferentially about the axis of rotation; and
at least one of the plurality of segments having a radially extending wall with an aperture; and
a pin extending through the aperture and a hole in the carrier, the pin having an ellipsoid portion between a first end and a second end, wherein the pin is oriented in a generally circumferential direction with respect to the axis of rotation.

15. The turbine section of claim 14, wherein the hole is on a first radially inwardly extending tab of the carrier, the carrier having a second radially inwardly extending tab having a second hole, the radially extending wall arranged between the first and second radially inwardly extending tabs, and the pin extending through the hole and the second hole.

16. The turbine section of claim 14, wherein the pin is a unitary piece.

17. The turbine section of claim 14, wherein a sleeve is arranged in the aperture radially outward of the pin.

18. The turbine section of claim 14, wherein the at least one segment is a ceramic material.

19. The turbine section of claim 14, wherein the carrier is a metallic material.

20. The flowpath component assembly of claim 1, wherein the first end is a pin head having a first diameter which is larger than a second diameter at the second end.

* * * * *